United States Patent
Lee et al.

(10) Patent No.: US 8,648,800 B2
(45) Date of Patent: Feb. 11, 2014

(54) CONTROL METHOD AND SYSTEM OF BRAIN COMPUTER INTERFACE WITH STEPPING DELAY FLICKERING SEQUENCE

(75) Inventors: Po-Lei Lee, Jhongli (TW); Kuo-Kai Shyu, Jhongli (TW); Hsiang-Chih Chang, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 139 days.

(21) Appl. No.: 13/357,181

(22) Filed: Jan. 24, 2012

(65) Prior Publication Data

US 2013/0100010 A1 Apr. 25, 2013

(30) Foreign Application Priority Data

Oct. 19, 2011 (TW) .............................. 100137958 A

(51) Int. Cl.
*G09G 5/00* (2006.01)
(52) U.S. Cl.
USPC ................ 345/156; 345/82; 463/36; 600/544
(58) Field of Classification Search
USPC ............ 345/156–158, 82, 83, 88; 463/36–39; 600/300, 544, 545
See application file for complete search history.

(56) References Cited

U.S. PATENT DOCUMENTS

| 4,926,969 A | 5/1990 | Wright et al. | |
| 5,638,826 A * | 6/1997 | Wolpaw et al. | 600/544 |
| 2002/0107454 A1* | 8/2002 | Collura et al. | 600/544 |
| 2012/0069247 A1* | 3/2012 | Morikawa et al. | 348/734 |

FOREIGN PATENT DOCUMENTS

TW 591481 6/2004

OTHER PUBLICATIONS

M. Cheng, X. Gao, S. Gao, D. Xu. "Design and implementation of a Brin-Computer Interface with High Transfer Rates." IEEE Trans. Biomed. Eng., 49, pp. 1181-1186, 2002.
P.L. Lee, C.H.W., J.C. Hsieh, Y.T. Wu. "Visual Evoked Potential (VEP)-actuated brain computer interface: a brain-actuated cursor system." Electro. Lett., 21, pp. 832-834, 2005.
Y. Wang, et al. "A Practical VEP-based Barin-Computer Interface" IEEE Trans. Neural Syst. Rehabil. Eng., 14, pp. 234-239, 2006.
P.L. Lee, J.C. Hsieh, C.H. Wu, T.C. Yeh, and Y.T. Wu. "The brain computer interface using flash evoked potential and independent component analysis" Ann. Biomed. Eng., 34, pp. 1641-1654, 2006.
P.L. Lee, J.J. Sie, Y.J. Liu et al. An SSVEP-Actuated Brain Computer Interface Using Phase-Tagged Flickering Sequences: A Cursor System: Ann. Biomed. Eng., 38, pp. 2383-2397, Jul. 2010.

(Continued)

*Primary Examiner* — Kimnhung Nguyen
(74) *Attorney, Agent, or Firm* — McClure, Qualey & Rodack, LLP

(57) ABSTRACT

A control method of a brain computer interface (BCI) with a stepping delay flickering sequence is provided. First, a plurality of different flickering sequence signals are generated by encoding a static flashing segment and a plurality of stepping delay flashing segments divided in different time sequences. Then, a plurality of target images corresponding to the flickering sequence signals are displayed. Thereafter, a response signal generated by an organism evoked by the target images is acquired. Then, signal processing is performed on the response signal by using a mathematic method to distinguish which one of the target images is gazed by the organism. Thereafter, a controlling command corresponding to one of the target images is generated. A control system of a BCI with a stepping delay flickering sequence is also provided herein.

10 Claims, 6 Drawing Sheets

(56) References Cited

OTHER PUBLICATIONS

C. Jia, X. Gao, B. Hong, S. Gao. "Frequency and Phase Mixed Coding in SSVEP-Based Brain-Computer Interface" IEEE Trans. Biomed. Eng., 58, pp. 200-206, 2011.

H.C. Chang, P.L. Lee, M.T. Lo, I.H. Lee, T.K. Yeh, C.Y. Chang. "Indpendence of Amplitude-Frequency and Phase Calibrations in an SSVEP-based BCI Using Stepping Delay Flickering Sequences" IEEE, 2011.

English translation of abstract of TW 591481 (published Jun. 11, 2004).

* cited by examiner

CONTROL METHOD AND SYSTEM OF BRAIN COMPUTER INTERFACE WITH STEPPING DELAY FLICKERING SEQUENCE

RELATED APPLICATIONS

This application claims priority to Taiwan Application Serial Number 100137958, filed Oct. 19, 2011, which is herein incorporated by reference.

BACKGROUND

1. Technical Field

The present disclosure relates to a control method and a system of a brain computer interface (BCI), and more particularly to a control method and a system of a BCI with a stepping delay flickering sequence.

2. Description of Related Art

With the increasing innovation and progress in medical engineering, in recent years, a brain computer interface (BCI) system has been widely applied in a control interface for driving various special devices. For example, action commands from a wheelchair, sickbed or multimedia entertainment device can be converted into corresponding visual stimulation signals through a display device of the BCI system. Then, the BCI system acquires a brain wave signal generated by a user who is gazing at the display device, and determines the action command corresponding to the brain wave signal, so as to perform action control on the related device.

The conventional BCI technology includes a steady-state visual evoked potential (SSVEP) system, a flash visual evoked potential (FVEP) system, a phase tagged flickering sequence VEP system, and a biphasic stimulation VEP system, which are used for generating visual stimulation signals through different visual flickering sequence encoding manners.

However, the SSVEP system can only provide limited visual options, and when multi-frequency stimulation is used to increase the visual options, problems like different brain wave response powers and disordered flashing frames are caused. The FVEP system may generate frames in a chaotic flashing sequence, and may easily be interfered with other physiological signals. The phase tagged flickering sequence VEP system needs to first correct an initial flashing phase due to physiological reaction differences among different users, and may result in an offset of a response phase caused by the visual fatigue of the user after long-time use, so that the flashing phase must be corrected again. The biphasic stimulation VEP system needs to measure reference phases of the visual stimulation signal and the brain wave signal, and thus the redundant data is increased.

Therefore, the conventional technology still has the aforementioned disadvantages and defects to be solved.

SUMMARY

An aspect of the present disclosure is to provide a control system of a BCI with a stepping delay flickering sequence, and the control system includes a flickering sequence generating unit, a display unit, a measuring unit, and a signal processing unit. The flickering sequence generating unit is used for generating a plurality of different flickering sequence signals by encoding a static flashing segment and a plurality of stepping delay flashing segments divided in different time sequences. The display unit is electrically coupled to the flickering sequence generating unit, and includes a plurality of display areas for displaying a plurality of target images corresponding to the flickering sequence signals. The measuring unit is connected to an organism through an electrode, and is used for acquiring a response signal generated by the organism evoked by the target images. The signal processing unit is electrically coupled to the measuring unit and the flickering sequence generating unit, and performs signal processing on the response signal by using a mathematic method to distinguish which one of the target images is gazed by the organism, so as to generate a corresponding controlling command.

In an embodiment of the present disclosure, the stepping delay flashing segments are corresponding to a plurality of different delay periods.

In an embodiment of the present disclosure, the stepping delay flashing segments are corresponding to a delay flashing frequency, and the delay flashing frequency is adjustable.

In an embodiment of the present disclosure, the duration of the static flashing segment is adjustable.

In an embodiment of the present disclosure, the static flashing segment of each flickering sequence signal has a plurality of flashing cycles, and the flashing cycles are corresponding to a static flashing frequency.

In an embodiment of the present disclosure, the flickering sequence signals have the same or different static flashing frequencies.

In an embodiment of the present disclosure, a proportion of bright and dark sections in the flashing cycles is adjustable.

In an embodiment of the present disclosure, the flickering sequence generating unit includes a programmable chip. The programmable chip is at least one of a single chip, a field programming gate array (FPGA), and a micro-controller, and generates the flickering sequence signals via software, hardware or a combination of software and hardware.

In an embodiment of the present disclosure, the display brightness and displayed patterns in the display areas are adjustable.

Another aspect of the present disclosure is to provide a control method of a BCI with a stepping delay flickering sequence, and the control method includes the following operating steps. First, a plurality of different flickering sequence signals are generated by encoding a static flashing segment and a plurality of stepping delay flashing segments divided in different time sequences. Then, a plurality of target images corresponding to the flickering sequence signals are displayed. Thereafter, a response signal generated by an organism evoked by the target images is acquired. Then, signal processing is performed on the response signal by using a mathematic method to distinguish which one of the target images is gazed by the organism. Thereafter, a controlling command corresponding to one of the target images is generated.

In an embodiment of the present disclosure, the control method of the BCI further includes eliminating noises outside a preset frequency range in the response signal by using at least one of a digital filtering method, a temporal ensemble averaging technology, an independent component analysis method, an empirical mode decomposition method, and a wavelet analysis method, so as to improve the signal-to-noise ratio (SNR) of the response signal.

In an embodiment of the present disclosure, the signal processing on the response signal includes the following steps. First, superimposed averaging is performed on the response signal to generate an average response signal. Then, a plurality of normalized powers of the average response signal is calculated according to time sequence division of the static flashing segment and the stepping delay flashing segments. Thereafter, a step is performed to determine which one of the flickering sequence signals has maximum correlation with the response signal according to the maximum normalized power (MNP) in the normalized powers, so as to distinguish the target gazed by the organism. Then, a step is performed to determine whether the MNP is greater than a preset threshold, so as to decide whether a controlling command corresponding to the target gazed by the organism is generated.

In an embodiment of the present disclosure, the mathematic method includes at least one of Fourier transform, superimposed averaging and comparison of template power intensities, a neural network, support vector machines, and a hidden Markov model.

According to the technical content of the aspects of the present disclosure, the control system of the BCI can achieve the purpose of multi-channel target image display with fewer flashing frequencies, and has relatively stable and fast target distinguishing time, thereby improving the use convenience of the BCI.

BRIEF DESCRIPTION OF THE DRAWINGS

To make the aforementioned and other objectives, features, advantages, and embodiments of the present disclosure more comprehensible, the accompanying drawings are described below.

DETAILED DESCRIPTION

The spirit of the present disclosure is clearly illustrated below through drawings and detailed descriptions. Definitely, any person of ordinary skill in the art that understands preferred embodiments of the present disclosure may make modifications and improvements according to the techniques shown by the present disclosure, and the modifications and improvements do not depart from the spirit and scope of the present disclosure.

Figure 1:
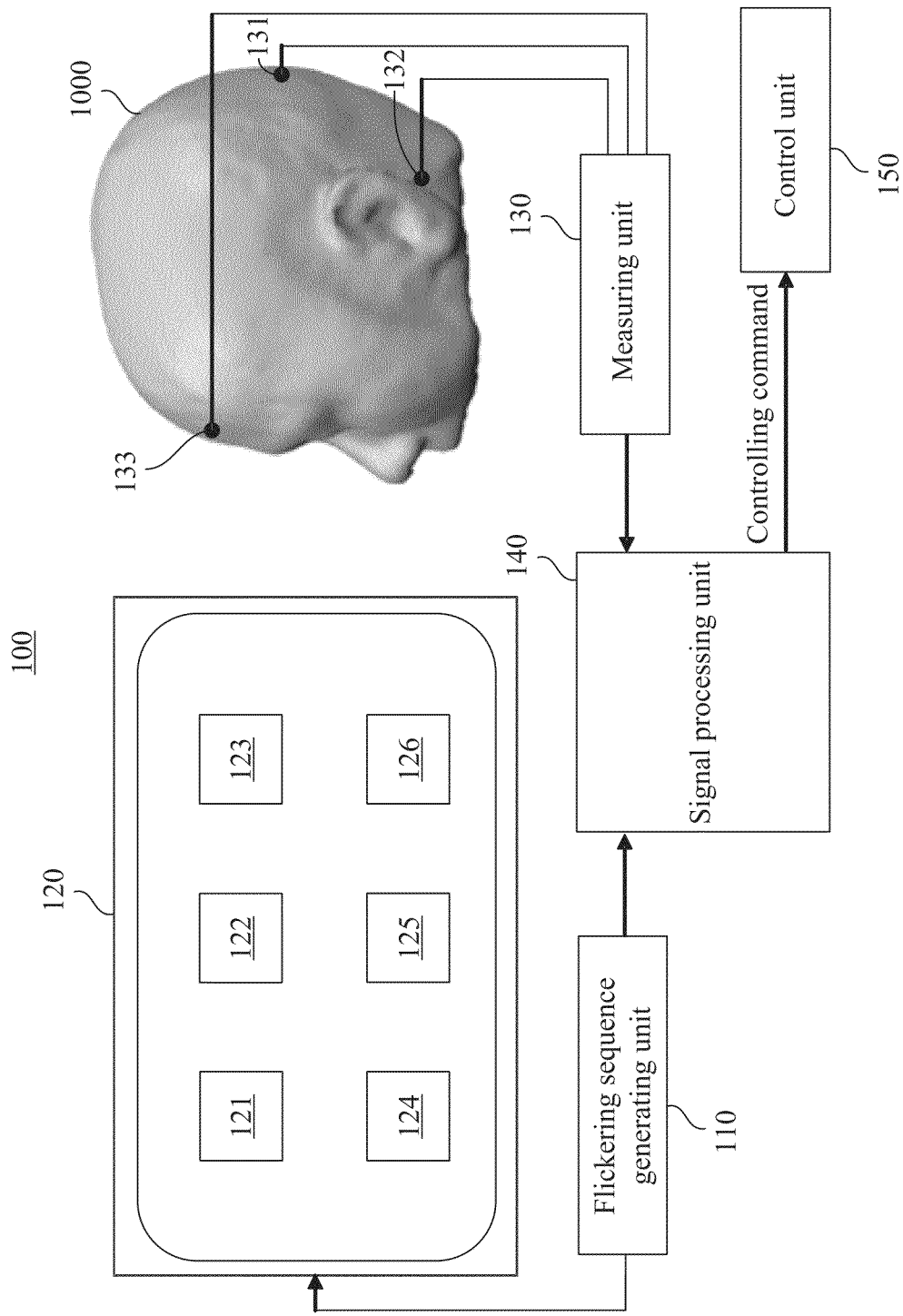
FIG. 1 is a schematic view showing a control system of a BCI with a stepping delay flickering sequence according to an embodiment of the present disclosure.

FIG. 1 is a schematic view showing a control system of a BCI with a stepping delay flickering sequence 100 according to an embodiment of the present disclosure. The control system of the BCI 100 may include a flickering sequence generating unit 110, a display unit 120, a measuring unit 130, and a signal processing unit 140.

Figure 2:
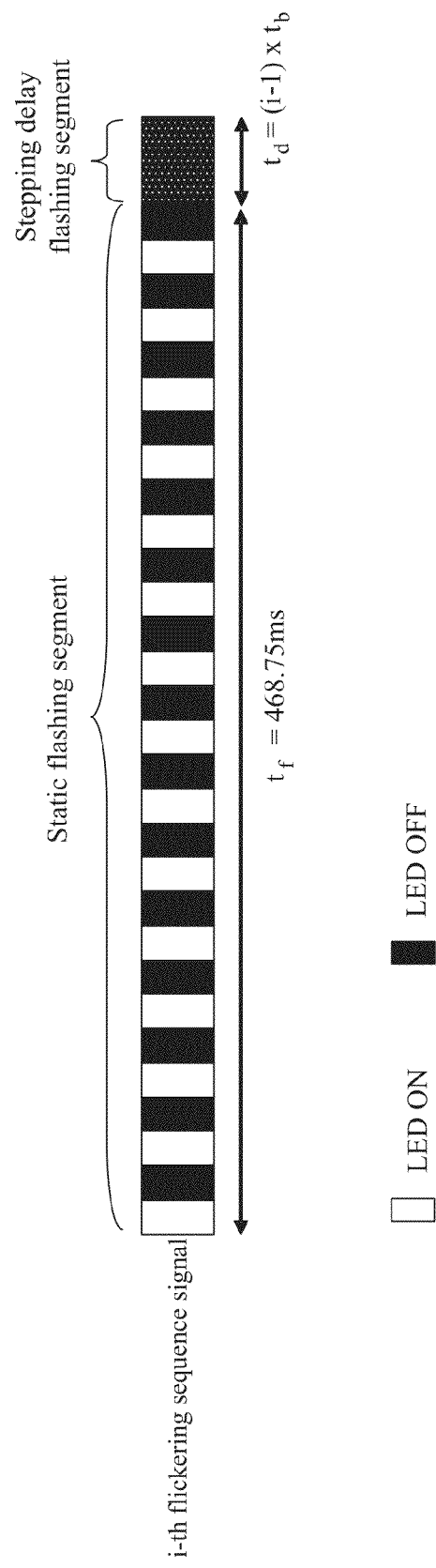
FIG. 2 is a schematic view showing encoding of a flickering sequence signal in the control system of the BCI as shown in FIG. 1.

Meanwhile referring to FIG. 2, FIG. 2 is a schematic view showing encoding of a flickering sequence signal in the control system of the BCI 100 as shown in FIG. 1. The flickering sequence generating unit 110 may be used for generating a plurality of different flickering sequence signals by encoding a static flashing segment $t_f$ (for example, 468.75 ms) and a plurality of stepping delay flashing segments $t_d$ (for example, 0 ms, 5.2 ms, 10.4 ms, 15.6 ms, 20.8 ms, and 26 ms) divided in different time sequences.

The display unit 120 is electrically coupled to the flickering sequence generating unit 110, and may include a plurality of display areas, such as display areas 121 to 126, for displaying a plurality of target images corresponding to the flickering sequence signals. In this embodiment, a light-emitting element in the display areas 121 to 126 may be any one of a bulb, an LED, and an LCD, but is not limited thereto.

The measuring unit 130 may be connected to an organism 1000 through electrodes 131 to 133, and be used for acquiring a response signal generated by the organism 1000 evoked by the target images. In this embodiment, for the measuring unit 130, the electrode 131 (a brain wave electrode) is adhered to an Oz visual area of the organism 1000 according to an International 10-20 system, and the electrode 132 (a reference electrode) is adhered to a mastoid behind an ear of the organism 1000, and the electrode 133 (a grounding electrode) is adhered to the forehead of the organism 1000. The measuring unit 130 may also include a biomedical signal amplifier and an analog-to-digital converter (not shown), so as to amplify an analog brain wave signal acquired by the measuring unit 130, and convert the amplified signal into a corresponding digital signal.

The signal processing unit 140 is electrically coupled to the measuring unit 130 and the flickering sequence generating unit 110, and may perform signal processing on the response signal by using a mathematic method to distinguish which one of the target images is gazed by the organism 1000, thereby generating and outputting a corresponding controlling command to the control unit 150, thus enabling the control unit 150 to manipulate a peripheral apparatus or communication device.

Referring to FIG. 2, in an embodiment of the present disclosure, the stepping delay flashing segments $t_d$ are corresponding to a plurality of different delay periods. For example, the stepping delay flashing segments $t_d$ of the first to the sixth flickering sequence signal may be configured as 0 ms, 5.2 ms, 10.4 ms, 15.6 ms, 20.8 ms, and 26 ms, so as to form six flickering sequence signals having different stepping delay flashing segments $t_d$.

In an embodiment of the present disclosure, the stepping delay flashing segments $t_d$ are corresponding to a delay flashing frequency, and the delay flashing frequency is adjustable. For example, the delay flashing frequency corresponding to the stepping delay flashing segments $t_d$ of the first to sixth flickering sequence signals can be adjusted to any frequency in the range of 0 Hz to 200 Hz. That is, the stepping delay flashing segment $t_d$ may include stepping flashing signals of a continuous bright state, a continuous dark state, or specific frequencies.

In an embodiment of the present disclosure, the duration of the static flashing segment $t_f$ is adjustable. For example, the duration of the static flashing segment $t_f$ may be adjusted to 468.75 ms, but is not limited thereto.

In an embodiment of the present disclosure, the static flashing segment $t_f$ of each flickering sequence signal has a plurality of flashing cycles, and the flashing cycles are corresponding to a static flashing frequency. For example, the static flashing segment $t_f$ of the first to sixth flickering sequence signals has 15 bright and dark flashing cycles. If the duration of the static flashing segment $t_f$ is 468.75 ms, each flashing cycle is corresponding to a static flashing frequency of 32 Hz.

In an embodiment of the present disclosure, the flickering sequence signals may have the same or different static flashing frequencies. For example, the first to sixth flickering sequence signals may have static flashing frequencies of 32 Hz, and the seventh to twelfth flickering sequence signals (not shown) may have static flashing frequencies of 35 Hz. It should be noted that, the number and the corresponding static flashing frequencies of the flickering sequence signals are set according to actual operation demands, and the present disclosure is not limited thereto.

In an embodiment of the present disclosure, a proportion between bright and dark sections in the flashing cycles is adjustable. For example, a flashing cycle corresponding to a static flashing frequency of 31.25 Hz is used for illustration. In this embodiment, the flashing cycle is 32 ms, and the bright and dark sections are respectively adjusted to 16 ms and 16 ms, so that the flashing cycle has a 50%-50% duty cycle. Further, the bright and dark sections may further be adjusted to 24 ms and 8 ms, such that the flashing cycle has a 75%-25% duty cycle.

Figure 3:
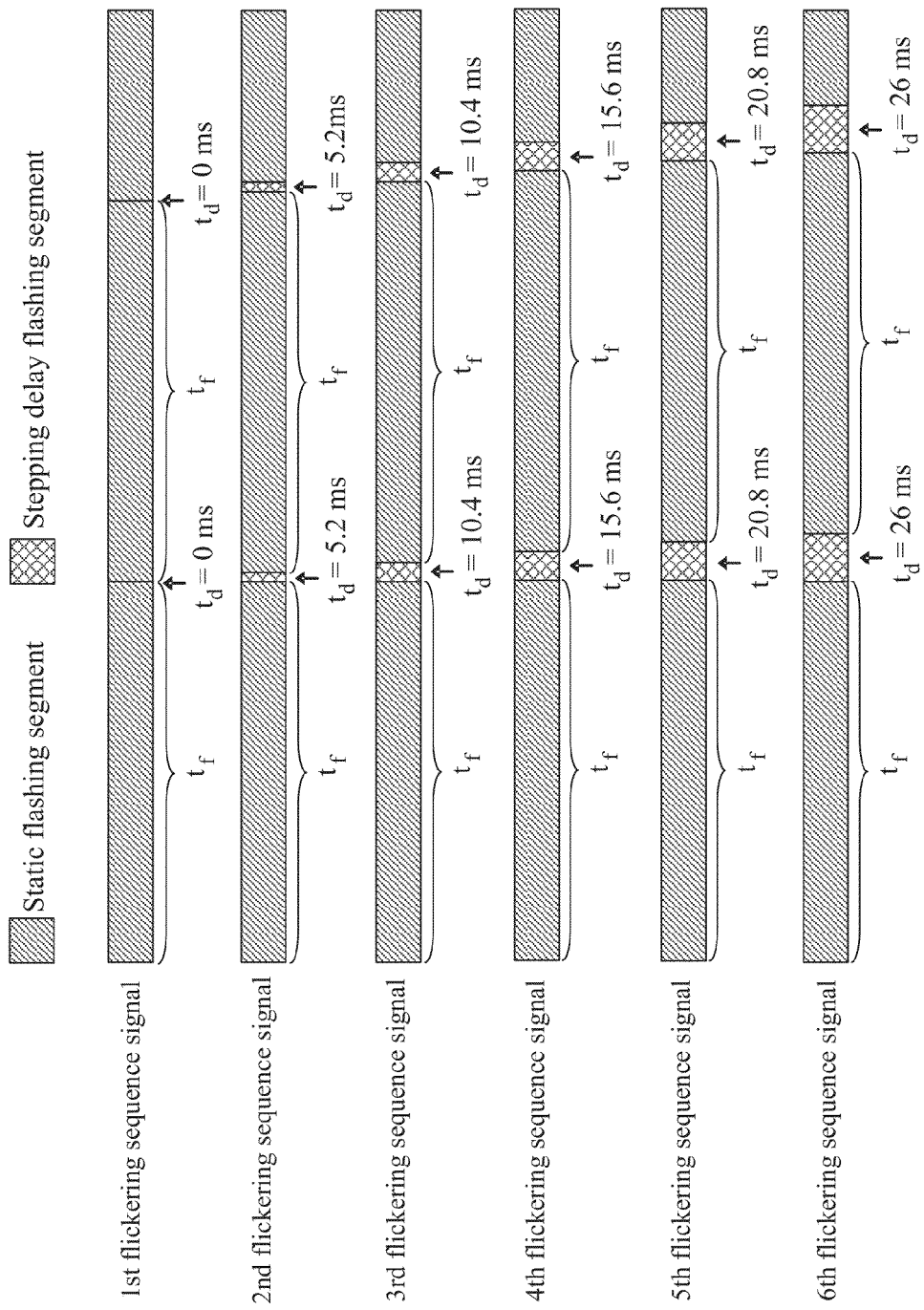
FIG. 3 is a schematic view showing encoding of a plurality of flickering sequence signals in the control system of the BCI as shown in FIG. 2.

FIG. 3 is a schematic view showing encoding of a plurality of flickering sequence signals in the control system of the BCI as shown in FIG. 2. For example, when six control actions are required to manipulate the peripheral apparatus and the communication device, the flickering sequence generating unit 110 may generate the first to sixth flickering sequence signals corresponding to the control actions. The first to sixth flickering sequence signals all include a static flashing segment $t_f$ lasting for 468.75 ms, and each static flashing segment $t_f$ has 15 bright and dark flashing cycles.

In this embodiment, the first flickering sequence signal may include a stepping delay flashing segment $t_d$ of 0 ms. That is, the first flickering sequence signal is encoded by following the static flashing segment $t_f$ with a next static flashing segment $t_f$ in the time sequence. The second flickering sequence signal may include a stepping delay flashing segment $t_d$ of 5.2 ms. That is, the second flickering sequence signal is encoded by following the static flashing segment $t_f$ with a stepping delay flashing segment $t_d$ of 5.2 ms and then with a next static flashing segment $t_f$ in the time sequence. Similarly, the third to sixth flickering sequence signals may respectively include stepping delay flashing segments $t_d$ of 10.4 ms, 15.6 ms, 20.8 ms, and 26 ms. Then, encoding is performed according to time sequence division of the static flashing segment $t_f$ and the stepping delay flashing segments $t_d$, to generate six flickering sequence signals having different stepping delay segments $t_d$, so as to respectively drive the display areas 121 to 126 of the display unit 120 and generate corresponding target images.

In an embodiment of the present disclosure, the flickering sequence generating unit 110 includes a programmable chip. The programmable chip may be at least one of a single chip, a FPGA, and a micro-controller, and generates the flickering sequence signals via software, hardware or a combination of software and hardware.

In an embodiment of the present disclosure, the display brightness and a displayed pattern of the display areas 121 to 126 are adjustable. That is, the display brightness may be adjusted according to visual comfort, and the displayed pattern may be any one of a geometric pattern, a static pattern, and a dynamic pattern, which is not limited herein.

Figure 4:
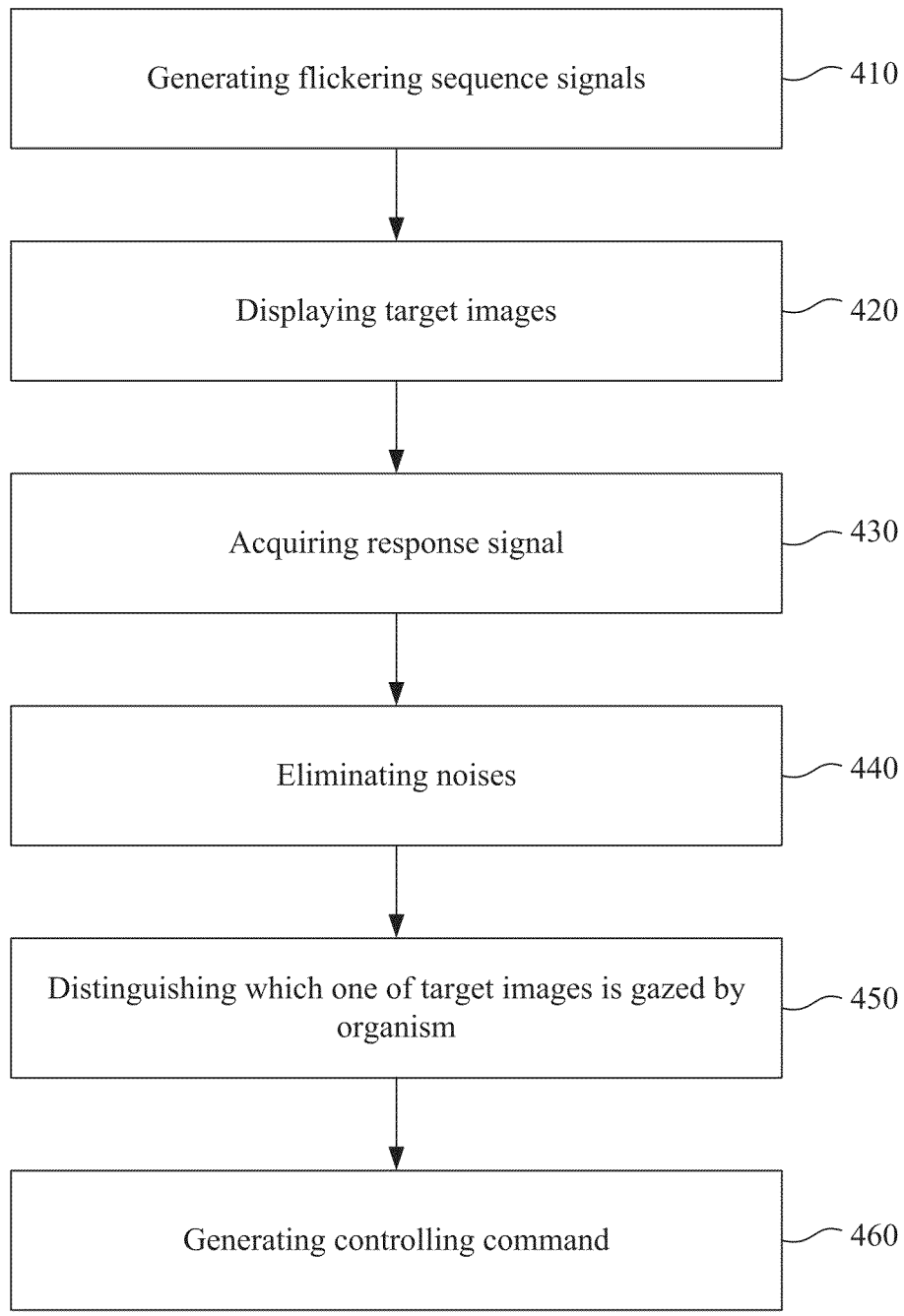
FIG. 4 is a flow chart showing a control method of a BCI with a stepping delay flickering sequence according to an embodiment of the present disclosure.

FIG. 4 is a flow chart showing a control method of a BCI with a stepping delay flickering sequence according to an embodiment of the present disclosure. The control method is applicable to the control system of the BCI with the stepping delay flickering sequence 100 in FIG. 1, and may include the following steps. First, in Step 410, a plurality of different flickering sequence signals are generated by encoding a static flashing segment $t_f$ and a plurality of stepping delay flashing segments $t_d$ divided in different time sequences. It should be noted that, the encoding manner of the flickering sequence signals in this embodiment is the same with or similar to that in FIG. 2 and FIG. 3, and thus the details thereof are repeated herein. Then, in Step 420, a plurality of target images corresponding to the flickering sequence signals are displayed. In Step 430, a response signal generated by the organism 1000 evoked by the target images is acquired. The control method of the BCI further includes eliminating noises outside a preset frequency range (for example, 29 Hz to 35 Hz) in the response signal by using at least one of a digital filtering method, a temporal ensemble averaging technology, an independent component analysis method, an empirical mode decomposition method, and a wavelet analysis method, so as to improve the SNR of the response signal, as shown in Step 440.

Afterwards, in Step 450, signal processing is performed on the response signal by using a mathematic method to distinguish which one of the target images is gazed by the organism 1000. In an embodiment, the mathematic method may include at least one of Fourier transform, superimposed averaging and comparison of template power intensities, a neural network, support vector machines, and a hidden Markov model, so as to provide an algorithm required by the signal processing.

Next, in Step 460, a controlling command corresponding to one of the target images is generated, so as to manipulate the peripheral apparatus and the communication device to perform corresponding actions.

Figure 5:
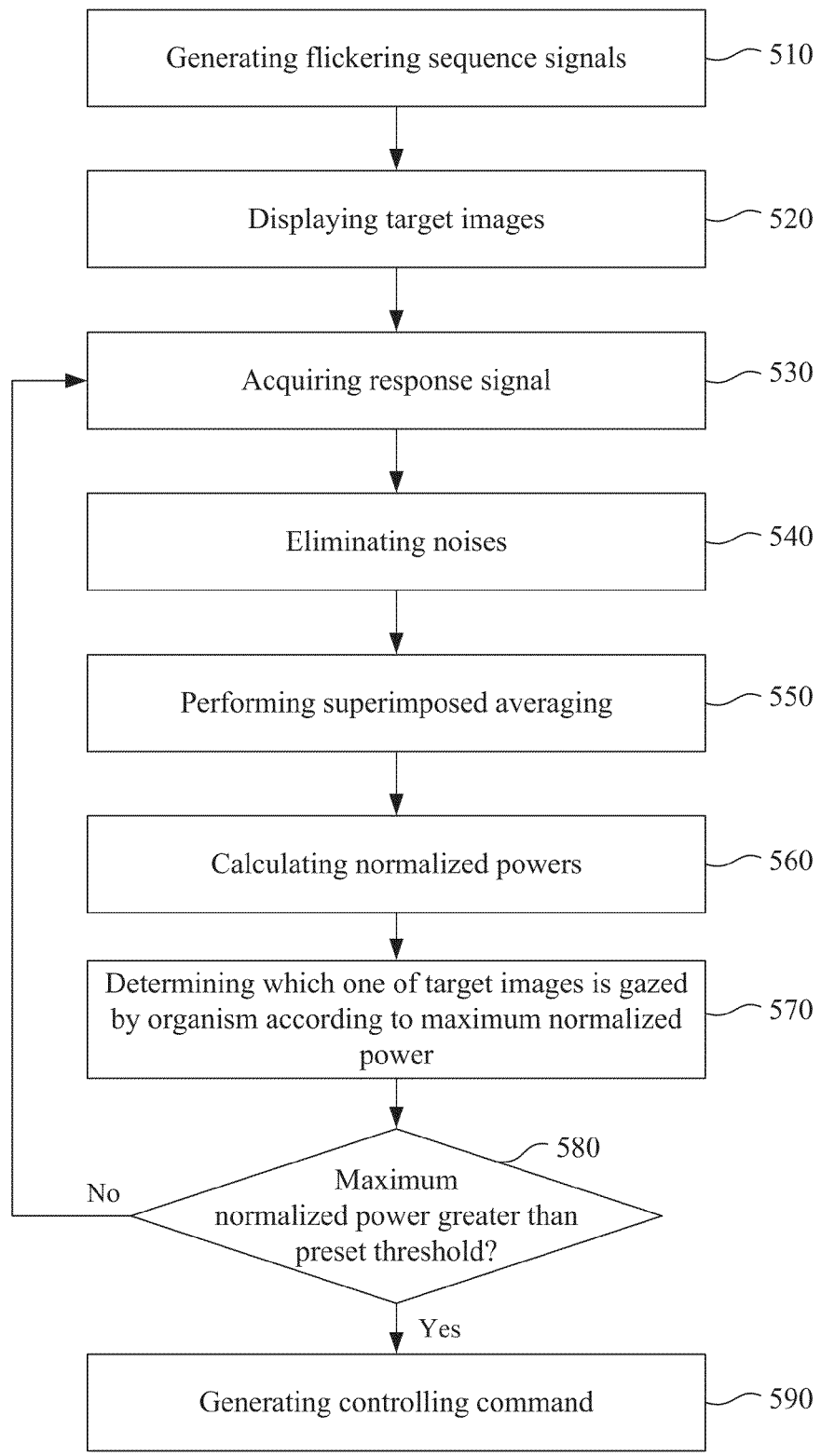
FIG. 5 is a flow chart showing a control method of a BCI with a stepping delay flickering sequence according to another embodiment of the present disclosure.
Figure 6A:
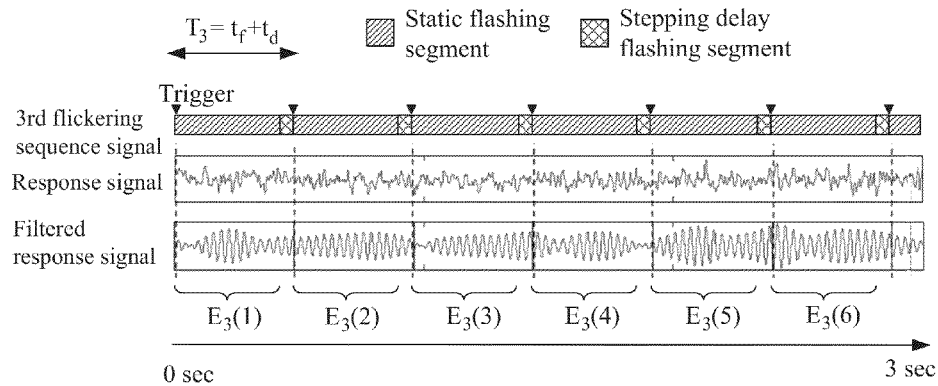
FIG. 6A is a schematic view showing a time sequence of a response signal in the control method of the BCI as shown in FIG. 5.
Figure 6B:
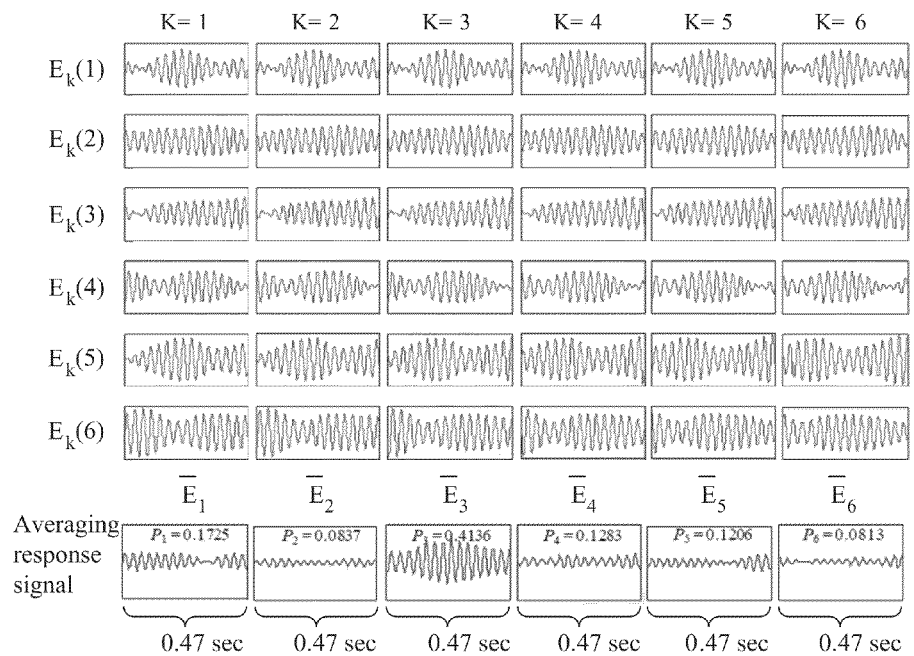
FIG. 6B is a schematic view showing a time sequence of a response signal calculated according to different segmenting cycles in the control method of the BCI as shown in FIG. 5.

In Step 450, the signal processing on the response signal may include several steps, which are illustrated herein by using an example with reference to FIG. 5 to FIG. 6B. FIG. 5 is a flow chart showing a control method of a BCI with a stepping delay flickering sequence according to another embodiment of the present disclosure. FIG. 6A is a schematic view showing a time sequence of a response signal in the control method of the BCI as shown in FIG. 5. FIG. 6B is a schematic view showing a time sequence of a response signal calculated according to different segmenting cycles in the control method of the BCI as shown in FIG. 5. The control method is applicable to the control system of the BCI with the stepping delay flickering sequence 100 in FIG. 1, and may include the following steps. It should be noted that, Step 510 to Step 540 are the same with or similar to Step 410 to Step 440 in FIG. 4, and thus are not be described herein.

In Step 550, superimposed averaging of the response signal may be performed according to time sequence division of the static flashing segment $t_f$ and the stepping delay flashing segments $t_d$, so as to generate an average response signal. Next, in Step 560, a plurality of normalized powers of the average response signal are calculated.

For example, each flickering sequence signal can be represented as a cycle sequence of $s_i(t)=s_i(t+T_i)$, where $T_i=t_f+(i-1)t_b$, $t_f$ is the duration of the static flashing segment (for example, 468.75 ms), $t_b$ is a basic delay time, and i is the number of the target images.

In this embodiment, the Fourier transform method is used for transforming the flickering sequence signals, to obtain the following arithmetic formula:

$$S_i(j\omega)=e^{j\omega T_i}S_i(j\omega).$$

In this embodiment, the flickering sequence signal $s_i(t)$ performs segmentation by using different trigger events from 0 ms to 468.75 ms. For example, a segmenting procedure with a segmenting cycle of $T_k$ is performed on the flickering sequence signal, so as to obtain segments $s_i(t)$, $s_i(t+T_k)$, ..., $s_i(t+5T_k)$, and to calculate an average response signal $\bar{s}_{i,k}(t)$ of the flickering sequence signal:

$$\bar{s}_{i,k}(t) = \frac{1}{6} \sum_{m=0}^{5} s_i(t + mT_k).$$

Then, the Fourier transform method is used to transform the average response signal into $\bar{S}_{i,k}(j\omega)$, which can be expressed in the following formula:

$$\bar{S}_{i,k}(j\omega) = F\{\bar{s}_{i,k}(t)\}$$

$$= F\left\{\frac{1}{6} \sum_{m=0}^{5} s_i(t + mT_k)\right\}$$

$$= \frac{1}{6} \sum_{m=0}^{5} e^{j\omega mT_k} S_i(j\omega)$$

$$= \frac{1}{6} \sum_{m=0}^{5} e^{j\omega m(T_k - T_i)} S_i(j\omega)$$

$$= \frac{1}{6} S_i(j\omega) \sum_{m=0}^{5} e^{j\omega m(T_k - T_i)}.$$

When the $k^{th}$ segmenting cycle is the same with the $i^{th}$ gazed target (k=i), the average response signal is obtained in the following formula:

$$\bar{S}_{i,i}(j\omega) = \frac{1}{6} S_i(j\omega) \sum_{m=0}^{5} e^{j\omega m(T_i - T_i)} = \frac{1}{6} S_i(j\omega) \sum_{m=0}^{5} e^0 = S_i(j\omega).$$

When the $k^{th}$ segmenting cycle is different from the $i^{th}$ gazed target (k≠i), the average response signal is obtained in the following formula:

$$\bar{S}_{i,k}(j\omega) = \frac{1}{6} S_i(j\omega) \sum_{m=0}^{5} e^{j\omega m(T_k - T_i)}$$

$$= \frac{1}{6} S_i(j\omega) \frac{1 - e^{j6\omega(T_k - T_i)}}{1 - e^{j\omega(T_k - T_i)}}$$

$$= \frac{1}{6} S_i(j\omega) \frac{1 - e^{j6\omega(k-i)t_b}}{1 - e^{j\omega(k-i)t_b}}.$$

In this embodiment, since the flashing frequency $f_0$ may be set to 32 Hz, the frequency is set to $\omega=\omega_0$, where $\omega=2\pi f$ and $t_b = \frac{1}{6}f$, and the average response signal $\bar{S}_{i,k}(j\omega)$ obtained when the $k^{th}$ segmenting cycle is different from the $i^{th}$ gazed target is expressed in the following formula:

$$\bar{S}_{i,k}(j\omega_0) = \frac{1}{6} S_i(j\omega_0) \frac{1 - e^{j6\omega_0(k-i)t_b}}{1 - e^{j\omega_0(k-i)t_b}}$$

$$= \frac{1}{6} S_i(j\omega_0) \frac{1 - e^{j6 \cdot 2\pi f(k-i)\frac{1}{6f}}}{1 - e^{j2\pi f(k-i)\frac{1}{6f}}}$$

$$= \frac{1}{6} S_i(j\omega_0) \frac{1 - e^{j2\pi(k-i)}}{1 - e^{j\frac{2\pi}{6}(k-i)}}$$

-continued $$= \frac{1}{6} S_i(j\omega_0) \frac{1-1}{1 - e^{j\frac{2\pi}{6}(k-i)}}$$

$$= 0.$$

Therefore, when the $k^{th}$ segmenting cycle is different from the $i^{th}$ gazed target, the average response signal is 0.

In an embodiment of the present disclosure, the response signal consists to of a brain wave signal of the organism 1000 evoked by six flickering sequence signals having different weights mathematically plus irrelevant noises in the SSVEP system, and the response signal may be expressed in the following formula:

$$x(t) = \sum_{i=1}^{6} a_i \cdot s_i(t - t_0) + n(t).$$

In the formula, $s_i(t)$ represents a brain wave response signal corresponding to the flickering sequence signal, $t_0$ is an SSVEP reaction delay time, and $a_i$ is a weight of the $i^{th}$ target image corresponding to the response signal. In this embodiment, the response signal $x(t)$ may be segmented into a plurality of epochs according to different segmenting cycles $T_k$ (k=1, ..., M). Thus, the epochs may be expressed as $E_k(j)$, where $E_k(j)$ is the $j^{th}$ epoch segment obtained by segmenting the response signal $x(t)$ with the trigger event of the $k^{th}$ flickering sequence signal.

Next, the foregoing superimposed averaging technology is used to obtain $$\bar{E}_k = \frac{1}{M} \sum_{j=1}^{M} E_k(j),$$

and normalized powers $$P_m = \|\bar{E}_m\|^2 \bigg/ \left(\sum_{k=1}^{M} \|\bar{E}_k\|^2\right)$$

are calculated.

When the organism 1000 gazes at the display area 123, since the display area 123 is driven by the third flickering sequence signal, the response signal from the organism 1000 acquired by the measuring unit 130 may be expressed as the schematic view of the time sequence in FIG. 6A. In the signal processing procedure, the response signal may be segmented according to time sequence divisions of the first to sixth flickering sequence signals, so as to obtain the schematic view of the time sequence in FIG. 6B. Therefore, the normalized power obtained by segmenting the response signal by using the segmenting cycle $T_1$ corresponding to the first flickering sequence signal is $P_1$=0.1725. Similarly, the normalized powers obtained by segmenting the response signal by using the segmenting cycles $T_3$ to $T_6$ corresponding to the second to sixth flickering sequence signals are respectively 0.0837, 0.4136, 0.1283, 0.1206, and 0.0813.

Since the response signal is synchronous with the flickering sequence signal for gazing, the target gazed by the organism 1000 can be obtained by using the MNP. That is, the maximum power among the six normalized powers is searched to obtain the MNP of $P_3=0.4136$, as shown in Step 570, and the response signal having maximum correlation with the third flickering sequence signal is determined according to the MNP. Therefore, the target gazed by the organism 1000 is distinguished as the display area 123.

Thereafter, Step 580 is performed to determine whether the MNP is greater than a preset threshold, so as to distinguish whether an effective brain wave signal is acquired, thereby deciding whether a controlling command corresponding to the target gazed by the organism 1000 is generated.

Compared with the conventional method, in the embodiment of the present disclosure, the flickering sequence signals after stepping delay flashing encoding are used for visual stimulation, and the temporal ensemble averaging method is used for mathematical operation, to distinguish the target gazed by the user. In this manner, multi-channel target image displaying with no need of phase correction and by using a few flashing frequencies is achieved; displayed frames with a neat flashing sequence are obtained; no visual discomfort is caused in use; the system is not easily interfered with other physiological signals; and the target distinguishing can be implemented steadily and rapidly, so as to improve the use convenience of the BCI.

The steps mentioned in the present disclosure may be performed in an order according to actual requirements, except for those specified in a certain order, and the steps may be performed simultaneously or partially at the same time, which are not limited herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A control system of a brain computer interface (BCI) with a stepping delay flickering sequence, the control system comprising:
    a flickering sequence generating unit for generating a plurality of different flickering sequence signals by encoding a static flashing segment and a plurality of stepping delay flashing segments divided in different time sequences, wherein the static flashing segment of each of the flickering sequence signals has a plurality of flashing cycles, and the flashing cycles are corresponding to a static flashing frequency, wherein a proportion between bright and dark sections in the flashing cycles is adjustable;
    a display unit which is electrically coupled to the flickering sequence generating unit, and comprises a plurality of display areas for displaying a plurality of target images corresponding to the flickering sequence signals;
    a measuring unit which is connected to an organism through an electrode, and is used for acquiring a response signal generated by the organism evoked by the target images; and
    a signal processing unit which is electrically coupled to the measuring unit and the flickering sequence generating unit, and performs signal processing on the response signal by using a mathematic method to distinguish which one of the target images is gazed by the organism, so as to generate a corresponding controlling command.

2. The control system of the BCI according to claim 1, wherein the stepping delay flashing segments are corresponding to a plurality of different delay periods.

3. The control system of the BCI according to claim 1, wherein the stepping delay flashing segments are corresponding to a delay flashing frequency, and the delay flashing frequency is adjustable.

4. The control system of the BCI according to claim 1, wherein the duration of the static flashing segment is adjustable.

5. The control system of the BCI according to claim 1, wherein the flickering sequence signals have the same or different static flashing frequencies.

6. The control system of the BCI according to claim 1, wherein the flickering sequence generating unit comprises a programmable chip, and the programmable chip is at least one of a single chip, a field programming gate array (FPGA), and a micro-controller and generates the flickering sequence signals via software, hardware or a combination of software and hardware.

7. The control system of the BCI according to claim 1, wherein the display brightness and displayed patterns of the display areas are adjustable.

8. A control method of a brain computer interface (BCI) with a stepping delay flickering sequence, the control method comprising:
    generating a plurality of different flickering sequence signals by encoding a static flashing segment and a plurality of stepping delay flashing segments divided in different time sequences;
    displaying a plurality of target images corresponding to the flickering sequence signals;
    acquiring a response signal generated by an organism evoked by the target images;
    performing signal processing on the response signal by using a mathematic method to distinguish which one of the target images is gazed by the organism; and
    generating a controlling command corresponding to one of the target images;
    wherein the step of performing signal processing on the response signal further comprises:
    performing superimposed averaging on the response signal to generate an average response signal;
    calculating a plurality of normalized powers of the average response signal according to time sequence divisions of the static flashing segment and the stepping delay flashing segments;
    determining which one of the flickering sequence signals has maximum correlation with the response signal according to the maximum normalized power (MNP) in the normalized powers, so as to distinguish the target gazed by the organism; and
    determining whether the MNP is greater than a preset threshold to decide whether a controlling command corresponding to the target gazed by the organism is generated.

9. The control method of the BCI according to claim 8, further comprising:
    eliminating noises outside a preset frequency range in the response signal by using at least one of a digital filtering method, a temporal ensemble averaging technology, an independent component analysis method, an empirical mode decomposition method, and a wavelet analysis method, so as to improve a signal-to-noise ratio (SNR) of the response signal.

10. The control method of the BCI according to claim 8, wherein the mathematic method comprises at least one of Fourier transform, superimposed averaging and comparison of template power intensities, a neural network, support vector machines, and a hidden Markov model.

* * * * *